United States Patent [19]
Coletti

[11] Patent Number: 6,092,073
[45] Date of Patent: Jul. 18, 2000

[54] YEAR 2000 COMPLIANCE METHOD WHICH OVERLAYS DAY AND/OR MONTH FIELDS WITH CENTURY DATA TO EXPAND SINGLE CENTURY SYSTEMS TO HANDLE MULTIPLE CENTURY DATA

[76] Inventor: Roger H. Coletti, 506 Long Dr., Wyckoff, N.J. 07481

[21] Appl. No.: 09/162,286

[22] Filed: Sep. 29, 1998

[51] Int. Cl.$^7$ .................................................. G06F 17/30
[52] U.S. Cl. ............................. 707/101; 707/6; 707/100
[58] Field of Search ..................... 707/1–7, 100, 707/101, 104; 395/707

[56] References Cited

U.S. PATENT DOCUMENTS

| | | | |
|---|---|---|---|
| 4,233,665 | 11/1980 | Maehashi et al. | 708/112 |
| 5,600,836 | 2/1997 | Alter | 707/101 |
| 5,630,118 | 5/1997 | Shaughnessy | 707/1 |
| 5,644,762 | 7/1997 | Soeder | 707/6 |
| 5,668,989 | 9/1997 | Mao | 707/101 |
| 5,740,442 | 4/1998 | Cox et al. | 395/704 |
| 5,758,331 | 5/1998 | Johnson | 707/101 |
| 5,758,346 | 5/1998 | Baird | 707/101 |
| 5,761,668 | 6/1998 | Adamchick | 707/101 |
| 5,765,145 | 6/1998 | Masiello | 707/1 |
| 5,794,048 | 8/1998 | Brady | 395/704 |
| 5,797,117 | 8/1998 | Gregovich | 707/101 |
| 5,806,063 | 9/1998 | Dickens | 707/6 |
| 5,852,824 | 12/1998 | Brown | 707/6 |
| 5,903,895 | 5/1999 | Hoffman et al. | 707/101 |
| 5,950,197 | 9/1999 | Beam | 707/6 |

OTHER PUBLICATIONS

"Method of Sorting Dates and Time Allowing for Wrapping," IBM Technical Disclosure Bulletin, Aug. 1994, pp. 381–382.

*Primary Examiner*—Hosain T. Alam
*Attorney, Agent, or Firm*—Caesar, Rivise, Bernstein, Cohen & Pokotilow, Ltd.

[57] ABSTRACT

A new method of numeric data handling employing numeric data overlay. This method is applied to the year 2000 problem such that it allows the storage of multiple century information along with the month, day and year into the 6-digit date field. The integrity of the existing data in the field is maintained along with the additional century information. This is accomplished by algorithms for encoding and decoding the date information consistent with the method of numeric data overlay. This method takes advantage of the unused number sequences above 12 in the month field and above 31 in the day field. Combining the power of the two ranges, a total of 24 range combinations are possible which can thus code for 24 different centuries while maintaining the original year, month and day information in the original 6-digit field format.

17 Claims, 2 Drawing Sheets

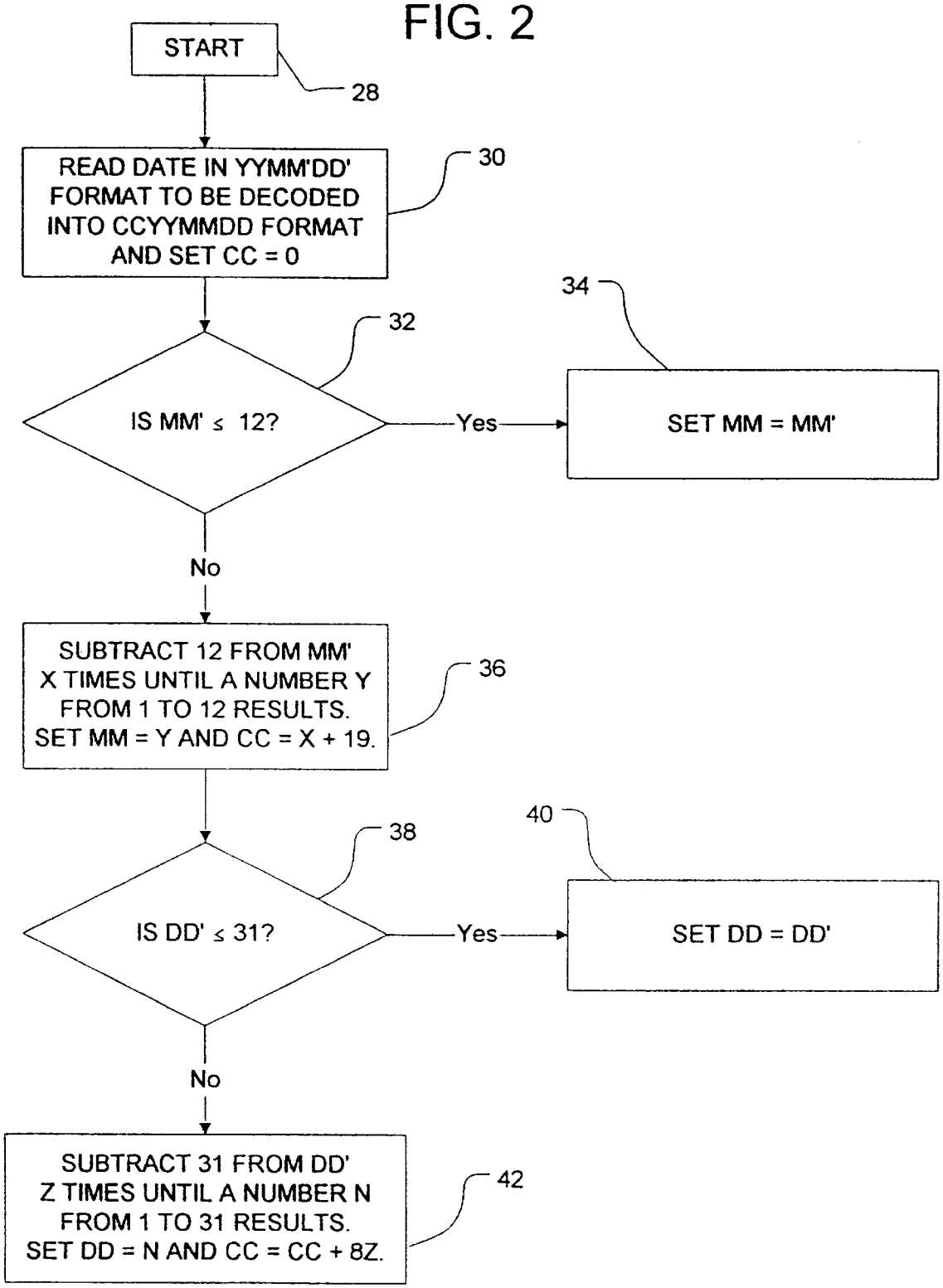

YEAR 2000 COMPLIANCE METHOD WHICH OVERLAYS DAY AND/OR MONTH FIELDS WITH CENTURY DATA TO EXPAND SINGLE CENTURY SYSTEMS TO HANDLE MULTIPLE CENTURY DATA

FIELD OF THE INVENTION

This invention relates generally to methods and systems for operating computer systems, and in particular to methods of systems for solving the so-called "Year 2000" or "Y2K" problem of computer software.

BACKGROUND OF THE INVENTION

As the twentieth century draws to a close, the computer industry finds itself facing a problem, which if unsolved by the year 2000, will cause serious repercussions beyond the computer industry. The collapse of global markets and economic depression have been cited as just two examples of the potentially catastrophic results of failing to cure the Y2K problem. Regardless of the accuracy of such doomsday predictions, there is consensus among experts that, at the very least, a great deal of money and time will be devoted to avoiding and/or correcting the Y2K problem and its effects.

Ironically, the people most responsible for the problem are those most likely to economically benefit from the need to avoid and/or correct it. The Y2K problem originated in the initial short-cited decision to assign only two digits for the year field within the date field (e.g., YYMMDD, wherein YY is the year of the century, MM is the month and DD is the day) in computer programs, because computer memory was very expensive and the year 2000 seemed very distant. Programmers continued to adhere to this initial convention until relatively recently, despite the advances in memory and the approach of the year 2000.

In the date format typically used over the last thirty years or so, the year 2000, 2001, et seq. is represented by the two digit codes of 00, 01, et seq. Accordingly, computer systems employing the obsolete date format without modification will be unable to distinguish between the year 2000 and the year 1900, for example, as the latter is also represented by the two digit code 00. Thus, if the computer system was, for example, to compare dates such as 1994 and 2000 to determine which was greater, an erroneous result would occur as the system would interpret the two digit representation of year 2000 (i.e., 00) as being less than the two digit representation of year 1994 (i.e., 94).

A number of purported solutions to the Y2K problem have been proposed.

One solution to this problem would be to convert all dates within the application system of the computer to use date fields with four digit representations for the year. This, however, is a relatively expensive solution for a variety of reasons. First, this solution requires the creation and testing of programs to convert all date fields in all application files. Second, this solution requires the creation and testing of all modifications to all date field processing routines currently used by the application system. Finally, this solution requires conversion of all files to the new formats together with implementation of all of the modified application processing routines. Other problems with this solution, apart from the cost, include the significant amounts of system downtime during the file conversions and the large amount of coordination required to prepare for the conversion while still accommodating normal maintenance activity.

U.S. Pat. No. 5,797,117 to Gregovich discloses a method wherein most of the unused portion of the month field in the date field (i.e., values of 13 through 99 for MM in YYMMDD) is used to identify the years 2000 through 2006. Starting on Jan. 1, 2000, the value for the month field increases by one for each successive month throughout the seven year period. The month field is not cleared every twelve months as in conventional schemes. Thus, the date field for Jan. 1, 2000 is 991301. The date field for Feb. 1, 2000 is 991401. The date field for Dec. 31, 2006, the final day in this seven-year solution, is 999631.

However, Gregovich at column 6, lines 1–2, teaches away from using the day field in the date field to solve the Y2K problem.

U.S. Pat. No. 5,600,836 to Alter discloses a method wherein time change interfaces convert 21st century date data to 20th century date data by subtraction. According to column 2, lines 8–11, the dates are in no more than two centuries.

U.S. Pat. No. 5,630,118 to Shaughnessy discloses a method wherein a subroutine, stored externally from the existing application programs in need of modification, converts existing six digit date fields to larger date fields including century data.

U.S. Pat. No. 5,644,762 to Soeder discloses a method which uses presently unused values within the existing six bytes of date fields in conventional systems to store data regarding the year. The years 00 to 99 only occupy a fraction of the two byte space allocated to year data. That is, two eight-bit bytes can represent any value from 0 through 65,535, but only two small subsets of this range are used to represent the values 00 to 99 under the ASCII and EBCDIC character sets. The values 0–12,335, 14,650–61,679 and 63,994–65,535 are free. Soeder proposes to solve the Y2K problem by integrating the existing year data with enhanced year data. In reading out a date, first the integer value of the two bytes of data written into the year value is determined. If this integer value is below 12,336, the integer value itself is taken to be the number of the year. If the integer value is in one of the subsets of the range reserved for existing character sets, the year is determined according to the appropriate character set.

U.S. Pat. No. 5,668,989 to Mao discloses a method comprising changing the data input/output mechanism, the storage and processing of 2 digit numbers, such that the higher digit of a 2 digit number is treated as a hexadecimal, and thus 160 (instead of 100) years can be represented with a 2 digit year number.

U.S. Pat. No. 5,740,442 to Cox et al. discloses a standardized method for identifying Y2K problems in programs and data.

U.S. Pat. No. 5,758,346 to Baird discloses a method wherein a system includes a database which stores representations of year data in either a two-digit or four-digit format, and a processor coupled to the database converts the representation into the other of the two-digit or four-digit format if the represented year falls within a floating window of years.

U.S. Pat. No. 5,761,668 to Adamchick discloses a method comprising converting existing YYMMDD characters to CYYDDD characters, wherein C is the century (starting with 1 as the 20th century) and DDD is the Julian day (0–366) of the year.

U.S. Pat. No. 5,765,145 to Masiello discloses a method, wherein day of the week data is used along with the conventional YYMMDD data to indicate the correct century.

U.S. Pat. No. 5,794,048 to Brady purports to disclose a method for identifying year-related fields in a program.

Despite the previous purported solutions to the Y2K problem, there is still room for improvement in the art. It would be advantageous to have a solution which minimizes the coordination efforts necessary to implement the solution, and which minimizes the downtime experienced by the application system.

All references cited herein are incorporated herein by reference in their entireties.

SUMMARY OF THE INVENTION

The invention provides a method for processing century data in a data processing system, wherein said data processing device includes a year field, and at least one of a day field and a month field, said method comprising at least one of (a) numerically overlaying at least one of said day field and said month field with century data, and (b) decoding century data numerically overlaid in at least one of said day field and said month field.

Also provided is a computer system comprising:
  a processor;
  memory, having date data storage fields comprising a year field, and at least one of a month field and a day field; and
  software, for use by said processor and said memory, for effecting date data processing steps,
  wherein said system is adapted to perform the method of the invention.

This invention comprises a new method of numeric data handling employing numeric data overlay. This method is applied to the year 2000 problem such that it allows the storage of multiple century information along with the month, day and year into the 6-digit date field. The integrity of the existing data in the field is maintained along with the additional century information. This is accomplished by algorithms for encoding and decoding the date information consistent with the method of numeric data overlay. This method takes advantage of the unused number sequences above 12 in the month field and above 31 in the day field. Multiples of 12 and 31 are added to these fields respectively placing the original data in a new numeric range, i.e., the months 1–12 are now found in the range of 13–24, respectively, or 37–48, respectively. Within these new ranges, subtracting off the added multiples of 12 identifies the original values of 1–12. The number of the multiples added and subsequently subtracted represents the century information encoded. A total of 8 ranges of 1–12 can be fit into a two digit month range and a total of 3 ranges of 1–31 can be fit into a two digit day range. Combining the power of the two ranges, a total of 24 range combinations are possible which can thus code for 24 different centuries while maintaining the original year, month and day information in the original 6-digit field format.

The algorithms for encoding and decoding can be of a pure mathematical type, using addition and subtraction, multiplication and division or more complex mathematical functions. Alternatively, each field combination can simply be mapped to a given century in the past or future. The logic of the algorithms are incorporated into the date manipulation function of computer programs or operating systems, allowing the computer to operate upon the encoded dates in a similar manner to the original 6-digit date data. While the stored dates may look somewhat unusual, the computer program can be arranged to readily display the date in a conventional type of format by generating 8-digit date field information, e.g., Dec. 25, 2010. Similar 8-digit fields are used for inputting the date information after which the date is then stored in a 6-digit field. The allowable range of numbers in a given date field is necessarily altered to permit the use of these additional number ranges.

By using numeric data overlay and encoding century data in the existing 6-digit date fields, computer programs have no difficulty identifying the year 2000, 3000 or even 4000. This method provides a unique solution to the "Year 2000" problem that should outlast all existing programs and databases.

Other types of date storage using 5-digit fields can also be modified. The Julian YYDDD format that would represent Feb. 1, 2098 as 98/032 has room for an additional day range of 366–730 that can be used to encode for dates in the next century. Again, the existing data would be unchanged and the date manipulation functions would be enhanced to recognize and operate upon the encoded dates.

BRIEF DESCRIPTION OF THE DRAWINGS

The invention will be described in conjunction with the following drawings in which like reference numerals designate like elements and wherein:

FIG. 2 is a flow chart illustrating an embodiment of the decoding method of the invention.

DETAILED DESCRIPTION OF PREFERRED EMBODIMENTS

Figure 1:
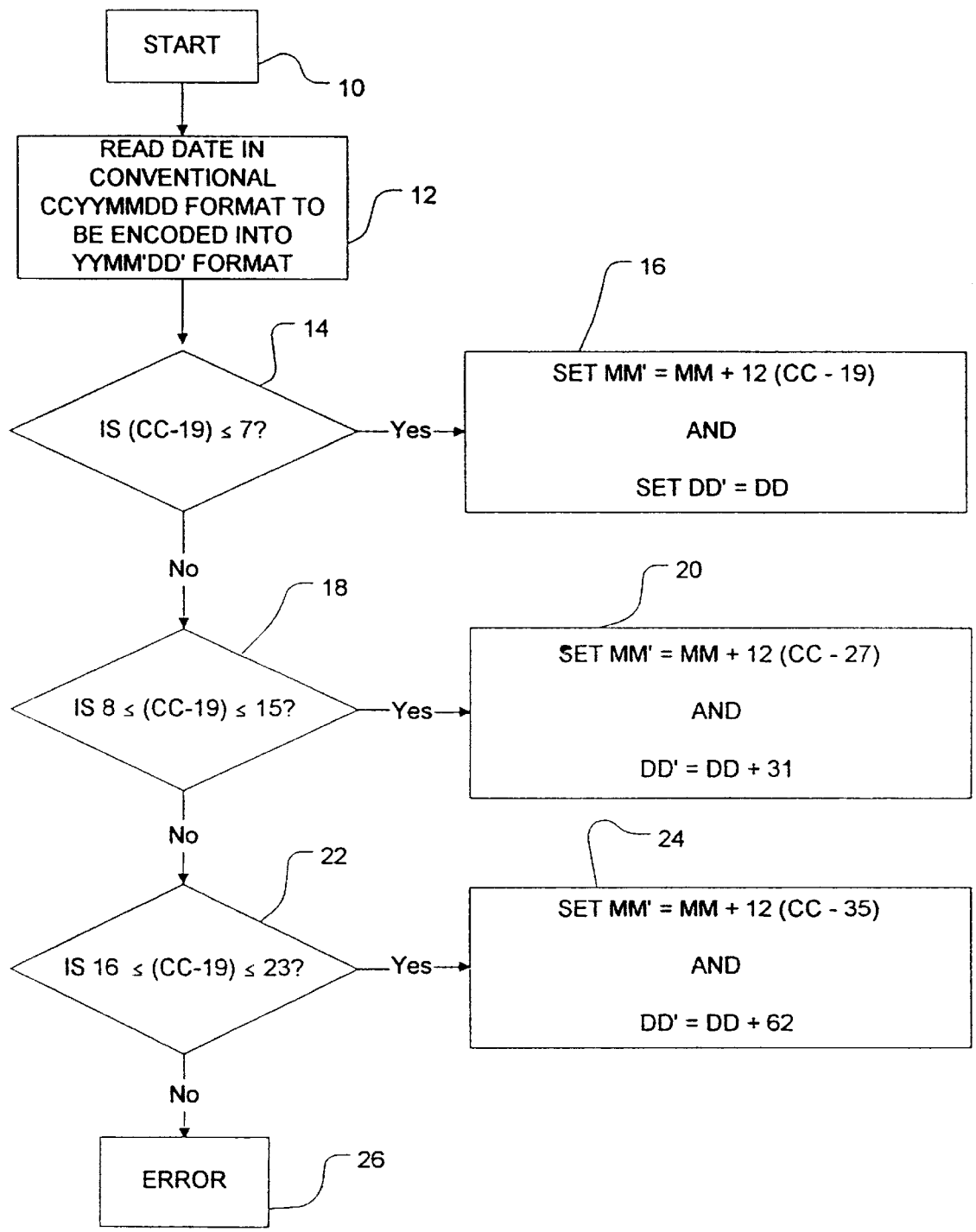
FIG. 1 is a flow chart illustrating an embodiment of the encoding method of the invention.

The invention comprises a method of advanced data manipulation, which can be used to solve the Y2K problem. This method of the invention employs algorithms to encode data within existing 6-digit formats programmed into data handling devices (e.g., computers) to include precise date identification over multiple centuries. This method does not change the integrity of the existing data structure and does not change any data as currently stored in 6-digit date databases.

This method of solving the Y2K problem can be implemented in a relatively simple fashion by incorporating the algorithm logic into the date manipulation functions within an existing program. Therefore, enhanced date functions would continue to handle dates in the current 6-digit format but will be able to handle and manipulate data with enhanced date information that has been encoded for multiple centuries. Input/output routines and edit date verification functions would also be modified but these combined changes represent a fraction of the work currently required to make programs Y2K compliant.

This method also represents a marked improvement over current windowing techniques as it is an essentially permanent solution to the encoding of date information for an additional 2 millennia. It thereby maintains the integrity of the current 6-digit date encoded database for the foreseeable future and for the potential useful life span of the programs and the database files.

This invention comprises a unique date encoding method for solving the year 2000 problem. The existing numeric six-character field can be left intact while successfully encoding unique dates beyond the year 4000. The method involves making use of a simple mathematical routine for coding and decoding dates.

The key to this method involves using the month numeric range from 13 to 96 and the day numeric range from 32 to 93 to encode for dates beyond and including the year 2000. The upper month range is used to encode for the first seven centuries starting at year 2000 and then the day range is additionally used to encode for the subsequent sixteen centuries. For the first seven centuries, 12 is added, for each century, to the month number. Thus, the date Jan. 1, 2011 would be encoded 111301 using an enhanced YYMMDD format.

The enhanced date format can be easily decoded into a conventional date format by simple arithmetic operations. The current month information is not lost in the enhanced date format of the invention, and can be regained by subtracting multiples of 12 from the month field until a remainder from 1 through 12 is reached. The number of such multiples of 12 signifies the number of centuries beyond 1900. The remainder signifies the month of the year in conventional terms (i.e., 1 is January, 2 is February, etc.). For example, the date Dec. 15, 2122 would be encoded 223615 in enhanced YYMMDD format. Thus, 36 minus 12 equals 24, and 24 minus 12 equals 12 which, of course, represents December. The two multiples of 12 it took to get a remainder value from 1 to 12 identify the century value as 21 (i.e., 19+2). A century value of 21 covers all years from 2100 through 2199 (as opposed to 22nd Century, which will run from 2101 through 2200).

For dates starting with Jan. 1, 2700 (i.e., dates following 999631, Dec. 31, 2699), previously unused portions of the day fields are used to store century data. The unused portion of the day field is, of course, the numbers 32–99. This range accommodates three multiples of 31. The initial multiple stores day data. The second multiple indicates that the century value is from 27 to 34 and the third multiple indicates that the century value is from 35 to 42.

In combination with the enhanced month field, a single increment of 31 to the day field represents an additional 800 years beyond conventional numbering. Two increments of 31 are possible representing an increment of 1600 years using the enhanced day and month fields. Thus, dates through the year 4299 can be encoded by the method of the invention.

In like manner to the month field, the day field is decoded by subtracting multiples of the added number to arrive at a remainder that is a conventional value for the field (numbers 1 through 31 in the case of the day field). Thus, the date May 12, 3020 would be 204143 in enhanced YYMMDD format, and is decoded by:

(1) subtracting 31 from the day field of 43 to obtain 12, a conventional day field number, signifying the day of the month;

(2) setting the century value from 27 to 35 based on the result of the first step, which required only 1 multiple of 31 to get a remainder from 1 to 31;

(3) subtracting 12 from the month field of 41 three times to obtain a remainder of 5, signifying that the month is May; and (4) incrementing the lowest century value in the range obtained in step (2) by the number of multiples obtained in step (3), thus signifying that the century value is 30 and the year is 3020.

Since this method of the invention involves potentially subtracting 12 or 31 from the month or day fields to achieve numbers of 1–12 for the month field and 1–31 for the day field, dates for the current century would not be altered. Thus current dates could be examined by the same algorithm as dates of 2000 and beyond. There is no need for a change in the date database and the YYMMDD, MMDDYY, DDM-MYY or any similar formats could be used.

Referring to FIG. 1, the combined algorithm for encoding date data can be stated as follows. The full date, including the century value, year, month and day, is read in, e.g., CCYYMMDD format, where CC=century value, YY=year, MM=month and DD=day (blocks 10 and 12), and encoded into, e.g., YYMM'DD' format, where YY is defined as above, MM' is the encoded month value and DD' is the encoded day value. If no century value is specified in the data to be encoded, it can be presumed that the data was created during the twentieth century and CC=19.

If the century value is 19 to 26, the month value is encoded by adding to it 12 (CC-19), and the encoded day value (DD') is equal to the conventional or unencoded day value (DD) (blocks 14 and 16).

If the century value is 27 to 34, the month value is encoded by adding to it 12 (CC-27), and the encoded day value (DD') is equal to the conventional or unencoded day value plus 31 (DD+31) (blocks 18 and 20).

If the century value is 35 to 42, the month value is encoded by adding to it 12 (CC-35), and the encoded day value (DD') is equal to the conventional or unencoded day value plus 62 (DD+62) (blocks 22 and 24).

If the century value is above 42, the system can be programmed to return an error message (block 26).

Referring to FIG. 2, the combined algorithm for decoding date data can be stated as follows. The encoded date is read in, e.g., YYMM'DD' format for decoding to, e.g., CCYYM-MDD format, and the value of CC is initially zeroed (blocks 28–30).

If the encoded month value (MM') is less than or equal to 12, no additional data was overlaid onto the month value, and thus, MM=MM' (blocks 32 and 34).

If the encoded value is greater than 12, century data was overlaid onto the conventional month value, and must be extracted from the encoded value to reveal MM and CC (blocks 32 and 36). The combined century and month data are separated by subtracting 12 from MM' until a number (Y) from 1 to 12 results. Y is the month MM (January is 1, February is 2, etc.), and the number of subtraction operations (or the number of multiples of 12 subtracted) is the century value CC.

The value of CC is further modified if century data is overlaid into the encoded day value DD'. If DD' is less than or equal to 31, no century data is overlaid thereon, and DD=DD' (blocks 38 and 40).

If DD' is greater than 31, century data is overlaid thereon, and must be extracted to reveal DD and CC (blocks 38 and 42). The combined century and day data are separated by subtracting 31 from DD' until a number (N) from 1 to 31 results. N is the day DD. The century value CC is determined by adding to the existing value of CC the number of subtraction operations (or the number of multiples of 31 subtracted) multiplied by 8 (block 42).

Numbers above 12 and 31 can be used but would limit the maximum date range that can be specified. Use of division and multiplication or other mathematical functions rather than subtraction and addition can alternatively be used to result in the same equivalent algorithm where this may be preferable to the programmer.

A trade off of the last 800 years, from year 3500 on, can be made in order to encode the years from 1100 up to 1900. This can be accomplished by changing the algorithm such that 62 is added to the day field for all such dates signifying minus 800 years from 1900. The month field is used in the same manner as previously described but starting from the year 1100. Thus the date Jun. 25, 1413 would be represented as 134287 in this variation of this method. 87 equals 25 (the day) plus 62 (two 31 multiples) signaling century starting at 1100, 42 equals 6 (the month) plus 36 (three 12 multiples) which adds 300 years to 1100, i.e., 1400.

Other variations of the method are also possible using encoding of the month and day fields for varying ranges of years to be encoded. Any combination of positive or negative 100 or 800 year blocks could be assigned to adjust the beginning and end of the potential 2400 year date range.

While one of the purposes of using numeric data overlay is not to alter the type of number storage in database 6-digit fields, there is one attractive option available when the existing number in the field can be signed positive or negative. In that case, the range of numeric data overlay is extended 2400 years into the past, i.e., prior to 1900, in addition to 2400 years into the future. For example, subtracting 12 from a month range of 1–12 gives a range of −11 to 0. This range can be used to code for the 19th century.

Prior centuries can also be coded for in like form by subtracting multiples of 12 or 31 from the month or day fields. For certain applications, where the capacity for signing numbers in existing fields already exists, this method may be preferable if a 4800 year range centering on 1900 is useful.

This invention can readily be applied to a Julian date field YY/JJJ (where JJJ is the day of the year) which is limited to a 100 year span. By encoding all the days in the JJJ section to a number 365 greater than the given day, all of those days will still be identifiable by subtracting back out the 365 and all dates with a day above the 365 range will identified as in the century beginning with the year 2000. The algorithm for encoding is simply to add 365 days for dates 2000–2099. The algorithm for decoding is to subtract 365 from the enhanced JJJ day number over 365 to return a remainder from 1 to 365. The decoded JJJ day number is the remainder, and the century value is 20. The year number is found in the YY field. Thus the date Jan. 1, 2000 would be represented by 00/366 and the date Jan. 20, 2020 would be represented by 20/385.

While the foregoing embodiment of the invention only allows one additional century to be specified with current Julian data systems, this should represent adequate time to permit further adaptation of the Julian date field system. The algorithm will work with numbers greater than 365 added to the Julian data but will not work if the number is greater than 635.

By taking advantage of the ability to encode century information in the month and day fields while keeping the primary data of those fields accessible, it is possible to use current six digit date specification to represent dates from 1900 to beyond the year 4000. Alternatively, any 2,400 year date span, which includes the current century, could be encoded with variations in the algorithm. The invention presented is a method of encoding this data that allows the maximum year date span to be encoded with the current 6-digit field. Use of relatively simple subroutines should allow encoding and decoding of dates for a 2,400 year date span without changing current 6-digit databases or can be used to extend the 5-digit Julian system for an additional 100 years.

The invention encompasses unique date handling functions which allow sorting of dates and determining the time, i.e., number of days, between two dates.

There are multiple methods for performing the calculation of determining the time between two dates. However, the most typical method is by assigning a specified date, i.e., Jan. 1, 1900, as day one and giving each successive day after that date a specific day number such as 18,262 for Jan. 1, 1950. Thus this specific day number can be added or subtracted from any other day number to determine the number of days between them. In order to adopt any of these program methods to use numeric data overlay, a specific number of days is added to the day number corresponding to the days remaining in this century from the chosen start date when dates are found to be encoded for the next century. In cases where the chosen start date was several centuries ago, i.e., Jan. 1, 1600, a number corresponding to the number of days from that date to the end of this century would then be added to the day number. For dates encoded for the 22nd, 23rd and subsequent centuries, specific additional days would be added to the day number to correspond to the days elapsed from the original start date to the beginning of that century. In this manner, a simple modification of the date manipulation function used to identify the time between two dates will allow a program to use a date encoded by the use of numeric data overlay.

The next most important function in date manipulation is the ability to sort dates into an ascending or descending sequence. Algorithmic encoding of dates is not generally recommended as a solution to the year 2000 problem because it places significant demands upon the computational complexity of date sorting. However, the method of numeric data overlay permits the development of simple altered date sorting routines which do not require the use of algorithms for reinterpretation of each date for sorting purposes. This is accomplished by presorting of the dates into centuries by using the month number (or in the case of dates from 2700, the day and then month number) and then sorting the dates within each century by year then month then day. This is a purely mathematical sorting routine which is designed by incorporating the logic of numeric data overlay in to the overall process rather than into recognition of each date.

If the day range 63–93 is used to encode for the years 1100–1899, as described above, as a variation of the encoding algorithm, the sorting routine is adjusted accordingly. In that case, all dates with day numbers in that range are post-sorted en masse and placed before all the other date entries. This post-sorting routine could thus simply correct for sorting the dates encoded 800 years before 1900.

A third important date manipulation function is determining leap years. For dates from 1900–1999 (with the exception of 1900) simply dividing YY by 4 identifies a leap year if there is no remainder. For dates encoded with numeric data overlay, leap years are all years evenly divisible by 4 (except 00 years). For 00 years, if integer division of (MM−1) by 12 equals 1 or 5, then that 00 year is a leap year. This simple trick works for 1900 as well and even works if the upper day range encodes for minus 800 years.

A fourth date manipulation function is determining the day of the week for any given date. While current programs commonly have routines applicable for this century, these routines would have to be enhanced in any case to deal with future centuries. The most direct method is to first assign a universal day number, in this case starting with Jan. 1, 1900 as day #1, then dividing this number by 7 and using the remainder to identify the day of the week. Since Jan. 1, 1900 was a Monday, the resulting number would represent a "1" as Monday with the rest of the week days to follow sequentially. This then only requires a routine to assign a universal day number to any date encoded with numeric data overlay. A routine in its most complex form, accounting for all dates which can be encoded by numeric data overlay is listed below. A much simpler version of this routine could be devised if dates were encoded only for a few additional centuries.

Universal day ([*MM*/12]36,524)+([*MM*/12]+2)/4]+([*DD*/31]250, 194)+(*YY*×365)+[(*YY*−1)/4]+R+(*M*−1)30)+*E*+*D*+*P*;

where R=1 if (YY=00 & if [(MM−1)/12]=(1 or 5) & if M≧3),
where M=((MM−1)mod12)+1,
where D=((DD−1)mod31)+1,
where E=(−1 if M=2;0 if M=1,3 or 4; 1 if M=5 or 6; 2 if M=7; 3 if M=8 or 9; 4 if M 10 or 11; 5 if M=12),
where P=1 (if (YY)mod4=0 & if M>3).

Bracketing indicates integer division. M & D represent true month and true day after decoding. E adjusts the day count for the difference in days of each month when (M−1) 30) is used to determine the days for months completed that year. P adds an extra day for each leap year starting on March 1st. R adds an extra day for the century leap years starting on March 1st. The first three sums represent the days for each eight-century and one-century jump accounting for the extra leap year day of a prior century leap year day. The next two sums represent the number of days for each year adding extra days for prior leap years in that century.

Once a universal day routine is established, this can be used to determine the difference in days between any two dates that have been encoded simply by subtracting the universal day numbers. Substituting such a routine for the existing one may be more fail-safe than patching existing routines, as all future dates with leap year corrections are fully accounted for.

There are mathematical shortcuts used by programmers to change YYMMDD to MMDDYY by multiplication by specified numbers and then taking a part of the resulting number as the new format with a correct transposition of the numbers. Since the method of numeric data overlay uses numbers stored in the original form, such a shortcut will produce correct transformations even for dates beyond the year 2000 stored by numeric data overlay. This property is extremely important in solving the year 2000 problem as shortcuts such as this are often embedded into programs without explanation and will lead to errors if data is stored in a compressed format.

With solutions to the functions of sorting and determining the time between two dates in hand, determining leap years, determining the day of the week and assigning a universal day number, other date manipulation functions can be fairly simply altered to handle the new encoded dates.

The method of numeric data overlay is essentially the creation of a new form of counting. While this method continues to use base 10 for the numbers 1 through 9 in each field, it is actually using a modified base 12 for the MM field and a modified base 31 for the DD field. Each increment in base 12 is used as an increment to a generated base 8 number. Each increment in the base 31 is used as a multiple to the base 8 number. For example, a month 25 represents a 2 in the derived base 8 number as it is within the third range of a base 12 representation of month numbers. If a day number of 35 was encountered, this would represent a 1 in the base 31 system of days and thus generate a number 1 in the 81 column of the base 8 number. In this specified example of month 25 and day 35, the base 8 number would thus be 12. The highest base 8 number that can be generated in this manner is 27.Thus, the range of base 8 numbers is from 00 to 27, corresponding to the base 10 numbers 00 to 23, respectively. These numbers can thus encode for century data over 24 different centuries (where 00 is a base century value).

As can be understood from the above, the process of numeric data overlay has a strong number theory origin. As with any modification of existing number theory and counting methods, this method requires data handling techniques, several of which are described above which incorporate the logic of this new method. Additional numeric functions can be readily generated as needed to perform other required operations which are then derived from the axioms of numeric data overlay.

While the invention has been described in detail and with reference to specific examples thereof, it will be apparent to one skilled in the art that various changes and modifications can be made therein without departing from the spirit and scope thereof.

What is claimed is:

1. An improved method for processing century data in a data processing device having a date field including a day field, a month field, and a year field for encoding within the date field a date to be encoded having century data therein and a century data upper limit in order to provide an encoded date field including an encoded day field, an encoded month field, and an encoded year field, comprising the steps of:

(a) determining a plurality of day ranges according to the day field;
   (b) determining a plurality of month ranges according to the month field;
   (c) determining the century data of a date to be encoded;
   (d) comparing the determined century data with a predetermined century value wherein the predetermined century value is substantially smaller than the century value upper limit;
   (e) selecting a day range of the plurality of day ranges according to the comparison;
   (f) selecting a month range of the plurality of month ranges according to the comparison; and
   (g) determining the encoded date field according to a product of the selected day range and the selected month range.

2. The improved method for processing century data of claim 1, comprising the steps of:

(h) determining three day ranges; and
   (i) selecting a day range of the three day ranges according to three comparisons of the determined century data with three predetermined century values.

3. The improved method for processing century data of claim 2, comprising the step of determining the three clay ranges according to the maximum number of days in a month and the maximum capacity of the encoded day field.

4. The improved method for processing century data of claim 3, comprising the steps of:

(j) determining eight month ranges; and
   (k) selecting a month range of the eight month ranges according to the three comparisons of the determined century data with the three predetermined century values.

5. The improved method for processing century data of claim 4, comprising the step of determining the eight month ranges according to the number of months in a year and the maximum capacity of the encoded month field.

6. The improved method for processing century data of claim 5, comprising the step of subtracting one of three further century values from the century data and multiplying the result by 12.

7. The improved method for processing century data of claim 4, comprising the step of selecting a month value within the selected month range according to the century data.

8. The improved method for processing century data of claim 7, comprising the steps of:
   (l) determining three further century values according to the predetermined value 19 and multiples of 8 added to the value 19; and
   (m) selecting one of the three further century values according to the three comparisons of step (i).

9. The improved method for processing century data of claim 8, comprising the step of determining the value of the encoded day field by summing the value of the month field of the date to be encoded and a multiple of 12.

10. The improved method for processing century data of claim 2, comprising the step of determining the value of the encoded day field by summing the value of the day field of the date to be encoded with a multiple of 31.

11. The improved method for processing century data of claim 10, comprising the step of selecting the multiple of 31 according to the selected day range.

12. The improved method for processing century data of claim 10, comprising the step of decoding the value of the encoded day field to provide a decoded day field by subtracting the value 31 from the encoded day field until the remainder value is less than 31.

13. The improved method for processing century data of claim 12, comprising the step of determining the number of times the value 31 is subtracted from the value of the encoded day field before the remainder value is less that 31.

14. The improved method for processing century data of claim 12, comprising the step of determining the number of times the value 31 is subtracted from the value of the encoded day field before the remainder value is less that 31.

15. The improved method for processing century data of claim 10, comprising the step of selecting the multiple of 31 according to the selected day range.

16. The improved method for processing century data of claim 10, comprising the step of decoding the value of the encoded day field to provide a decoded day field by subtracting the value 31 from the encoded day field until the remainder value is less than 31.

17. The improved method for processing century data of claim 2, wherein the three predetermined century values are 7, 15, and 23.

* * * * *